US010752785B2

(12) United States Patent
Neigel

(10) Patent No.: US 10,752,785 B2
(45) Date of Patent: Aug. 25, 2020

(54) ANTI-SLIP BOTANICAL ANTIMICROBIAL MICROEMULSIONS

(71) Applicant: Dennis Victor Neigel, Salisbury, NC (US)

(72) Inventor: Dennis Victor Neigel, Salisbury, NC (US)

(73) Assignee: Indusco, Ltd., Greensboro, NC (US)

( * ) Notice: Subject to any disclaimer, the term of this patent is extended or adjusted under 35 U.S.C. 154(b) by 109 days.

(21) Appl. No.: 15/330,339

(22) Filed: Sep. 9, 2016

(65) Prior Publication Data

US 2018/0072894 A1 Mar. 15, 2018

(51) Int. Cl.
| | | |
|---|---|---|
| *B05D 3/00* | (2006.01) | |
| *C09D 5/02* | (2006.01) | |
| *C09D 5/14* | (2006.01) | |
| *A01N 65/00* | (2009.01) | |
| *A01N 31/08* | (2006.01) | |
| *A01N 65/44* | (2009.01) | |
| *A01N 65/22* | (2009.01) | |
| *A01N 65/36* | (2009.01) | |
| *C08K 5/103* | (2006.01) | |
| *B05D 5/02* | (2006.01) | |

(52) U.S. Cl.
CPC ............ *C09D 5/022* (2013.01); *A01N 31/08* (2013.01); *A01N 65/00* (2013.01); *A01N 65/22* (2013.01); *A01N 65/36* (2013.01); *A01N 65/44* (2013.01); *C09D 5/024* (2013.01); *C09D 5/14* (2013.01); *B05D 5/02* (2013.01); *C08K 5/103* (2013.01)

(58) Field of Classification Search
CPC .......... C09D 5/022; C09D 5/14; A01N 25/04; A01N 25/30; A01N 27/00; A01N 65/00; B05D 3/007; B05D 5/08; C11D 1/66; C11D 3/18; C11D 3/50
See application file for complete search history.

(56) References Cited

U.S. PATENT DOCUMENTS

| | | | |
|---|---|---|---|
| 2,005,008 | A | 6/1935 | Schaer |
| 3,560,385 | A | 2/1971 | Roth |
| 3,730,701 | A | 5/1973 | Isquith et al. |
| 3,794,736 | A | 2/1974 | Abbott et al. |
| 3,860,709 | A | 1/1975 | Abbott et al. |
| 3,865,728 | A | 2/1975 | Abbott et al. |
| 4,005,025 | A | 1/1977 | Kinstedt |
| 4,005,028 | A | 1/1977 | Heckert et al. |
| 4,005,030 | A | 1/1977 | Heckert et al. |
| 4,161,518 | A | 7/1979 | Wen et al. |
| 4,282,366 | A | 8/1981 | Eudy |
| 4,361,273 | A | 11/1982 | Levine et al. |
| 4,393,378 | A | 7/1983 | Danielsen et al. |
| 4,394,378 | A | 7/1983 | Klein |
| 4,406,892 | A | 9/1983 | Eudy |
| 4,421,796 | A | 12/1983 | Burril et al. |
| 4,467,013 | A | 8/1984 | Baldwin |
| 4,564,456 | A | 1/1986 | Homan |
| 4,567,039 | A | 1/1986 | Stadnick et al. |
| 4,615,882 | A | 10/1986 | Stockel |
| 4,682,992 | A | 7/1987 | Fuchs |
| 4,781,974 | A | 11/1988 | Bouchette et al. |
| 4,797,420 | A | 1/1989 | Bryant |
| 4,842,766 | A | 6/1989 | Blehm et al. |
| 4,847,088 | A | 7/1989 | Blank |
| 4,908,355 | A | 3/1990 | Gettings et al. |
| 5,013,459 | A | 5/1991 | Gettings et al. |
| 5,411,585 | A | 5/1995 | Avery et al. |
| 5,468,725 | A | 11/1995 | Guenin et al. |
| 5,660,891 | A | 8/1997 | Kenyon et al. |
| 5,698,021 | A * | 12/1997 | Dorsett ............... C04B 41/5353 106/287.27 |
| 5,719,114 | A | 2/1998 | Zocchi et al. |
| 5,954,863 | A | 9/1999 | Loveless et al. |
| 5,954,869 | A | 9/1999 | Elfersy et al. |
| 5,959,014 | A | 9/1999 | Liebeskind et al. |
| 6,110,474 | A | 8/2000 | Roman |
| 6,235,298 | B1 | 5/2001 | Naser et al. |
| 6,376,696 | B1 | 4/2002 | Raab et al. |
| 6,384,003 | B1 | 5/2002 | Julemont |
| 6,451,755 | B1 | 9/2002 | Norman |
| 6,613,755 | B2 | 9/2003 | Peterson et al. |
| 6,632,805 | B1 | 10/2003 | Liebeskind et al. |
| 8,541,610 | B2 | 9/2013 | Taralp |

(Continued)

FOREIGN PATENT DOCUMENTS

| | | |
|---|---|---|
| CA | 1217004 | 1/1987 |
| EP | 2460409 | 6/2012 |

(Continued)

OTHER PUBLICATIONS

KR 20080011256 English translation. (Year: 2019).*
KR20080011256 (A) English translation. (Year: 2008).*
Sabine, J.R., et al. "Laboratory Evaluation of some Marine Plants on South Australian Beaches." J. Agric. Sci. Technol. (2001), vol. 3: pp. 91-100.
A. J. Asquith; Surface-Bonded Antimicrobial Activity of an Organosilicon !uaternary Ammonium Chloride; Copyright 1973 American Society of Microbiology; Applied Microbiology, Dec. 1972 p. 859-863, vol. 24, No. 6.
Traber, M.G., et al. "Vitamin E: function and metabolism," FASEB Journal. (Jul. 1999), vol. 13, pp. 1145-1155.

(Continued)

*Primary Examiner* — Hai Y Zhang
(74) *Attorney, Agent, or Firm* — Tuggle Duggins P.A.; Blake P. Hurt

(57) ABSTRACT

A method to coat hard floor surfaces to provide both anti-slip and antimicrobial protection by producing clear, thermodynamically stable, anti-slip, botanical antimicrobial microemulsions made for all renewable, non-toxic, non-corrosive ingredients is disclosed, as well as their use as 1) highly effective antimicrobial broad spectrum disinfectants/deodorants that are not hazardous to humans or animals and simultaneously 2) as anti-slip coatings for any walked-on hard floor surface.

2 Claims, No Drawings

(56) References Cited

U.S. PATENT DOCUMENTS

| | | |
|---|---|---|
| 8,921,303 B1 | 12/2014 | Lull et al. |
| 9,089,138 B2 | 7/2015 | Higgins et al. |
| 2003/0114345 A1 | 6/2003 | Leonard et al. |
| 2005/0008613 A1 | 1/2005 | Peterson et al. |
| 2005/0159063 A1* | 7/2005 | Hill ................... A47L 13/16 442/327 |
| 2006/0115440 A1* | 6/2006 | Arata .................. A61K 8/19 424/65 |
| 2006/0175295 A1* | 8/2006 | Chu .................. B24B 37/044 216/88 |
| 2006/0193816 A1 | 8/2006 | Elfersy et al. |
| 2007/0021383 A1 | 1/2007 | Loder |
| 2007/0161526 A1 | 7/2007 | Vlad et al. |
| 2007/0237901 A1 | 10/2007 | Moses et al. |
| 2007/0280982 A1* | 12/2007 | Ono ................... A23L 3/3463 424/410 |
| 2008/0181862 A1 | 7/2008 | Chisholm et al. |
| 2009/0178212 A1* | 7/2009 | Wahl .................. D06M 15/03 8/441 |
| 2010/0028462 A1 | 2/2010 | Bolkan et al. |
| 2010/0167613 A1 | 7/2010 | Higgins et al. |
| 2011/0233810 A1 | 9/2011 | Neigel et al. |
| 2012/0149623 A1 | 6/2012 | Li et al. |
| 2013/0030207 A1 | 1/2013 | Taralp |
| 2013/0333334 A1* | 12/2013 | Malchesky ......... A01N 25/04 53/474 |
| 2014/0329734 A1* | 11/2014 | Pegelow ............. C11D 3/386 510/392 |
| 2015/0182446 A1 | 7/2015 | Fenyvesi et al. |

FOREIGN PATENT DOCUMENTS

| | | | |
|---|---|---|---|
| GB | 1386876 | | 3/1975 |
| KR | 20080011256 A | * | 2/2008 |
| WO | 1997-041729 | | 11/1997 |
| WO | 2000-078770 | | 12/2000 |
| WO | 2007-133934 | | 11/2007 |
| WO | 2007133934 | | 11/2007 |
| WO | 2011-119237 | | 9/2011 |
| WO | 2011-123623 | | 10/2011 |
| WO | 2013-075921 | | 5/2013 |
| WO | 2015-002786 | | 1/2015 |
| WO | 2016-164545 | | 10/2016 |
| WO | 2018-048552 | | 3/2018 |

OTHER PUBLICATIONS

Google Search—jp 2091008—related patents, (the second being U.S. Pat. No. 8541610, No. 42 on this list) no date given.

International Search Report for PCT/US2016/026387 dated Jul. 15, 2016.

International Search Report for PCT/US2017/045857 dated Nov. 6, 2017.

* cited by examiner

ANTI-SLIP BOTANICAL ANTIMICROBIAL MICROEMULSIONS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM, LISTING COMPACT DISK APPENDIX OR A DESCRIPTION OF DRAWINGS

Not applicable

TECHNICAL FIELD OF THE INVENTION

The present invention relates to a method for coating a hard flooring surface to impart both anti-slip and antimicrobial properties to the coated surface using naturally derived, food grade, renewable, botanical, volatile essential oils to produce crystal clear, stable oil-in-water microemulsions that are used in the coating. In particular, the invention relates to the use of such microemulsions as anti-slip coatings providing safety against slips and falls on all hard surfaces by increasing the coefficient of friction of the surface, and simultaneously as antimicrobial agents that protect a variety of hard surfaces from microbial growth, yet these coatings have little or no human or animal toxicity.

BACKGROUND OF THE INVENTION

According to the Centers for Disease Control and Prevention in the United States, over one million Americans suffer a slip, trip, or fall injury every year. More than 17,000 people die annually from a slip and fall accident. Slip, trip, and fall injuries make up approximately 15% of all work-related injuries. There were 219,630 nonfatal falls, slips, and trips in workplaces in 2012, and 668 people experienced a fatal workplace fall, slip, or trip. Falls, slips, and trips are the second most common cause of work fatalities. Nearly 1,800 people die every year from falls and fall-related injuries in nursing homes across the United States. About 57% of fall injuries occur due to slipping, tripping, or stumbling and most of these falls occur at home—50% occur inside the home, and 24% occur around or close to the outside of the home. Over half of these fall injuries occurred on the floor or level ground. About 16% occurred on stairs or an escalator, 8% were associated with curbs and furniture, 29% occurred when an older adult was working around the house or yard, and over 20% occurred while the person was engaged in leisure activities. Adults over age 55 are more prone to slip and fall accidents. One in three people over age 65 falls every year—many times they are repeat falls. Falls are the most common cause of traumatic brain injuries. Falls are the leading cause of non-fatal medically treated injuries in the U.S. Falls cause approximately 8.9 million visits to the emergency room every year. Between 20% and 30% of people experience an injury after falling including lacerations, hip fractures, or head traumas.

Many of the above accidents occur due to slippery floors. In addition to being wet, floors can become slipperier after cleaning or polishing with conventional floor cleaning preparations. The degree of slipperiness of a floor is measured using scientific instruments that accurately determine the coefficient of friction (COF) on a scale of 0 to 1.00 with 0.50 or greater being an acceptable level of friction to prevent the great majority of potential slips. Most smooth floor surfaces that are not treated with anti-slip coatings will measure 0.20 to 0.35 COF, thus greatly increasing the probability of a slip and potential injury. To reduce this probability, anti-slip coatings can be applied to effectively increase the COF to safe levels, usually as dilute aqueous solutions that become effective upon drying at ambient conditions. Many anti-slip coatings are available as part of a detergent system that also cleans soiled floors, retards soil re-deposition and may also enhance gloss. However, many of these products are high in pH and contain volatile organics compounds of moderate to high toxicity that evaporate into the air as the anti-slip film dries. This evaporation can take up to several days to accomplish, thus resulting in long, slow human exposure to toxic vapors. The high pH of the residual film deposited on the floor presents a possible corrosivity issue with direct skin contact such as babies crawling, toddlers playing, dogs licking and people walking with bare feet on high pH coated floors. Indirect contact can occur when soles of shoes are touched during the process of removal from the foot. A third issue with most current coatings used as anti-slip agents is the toxic nature of the non-volatile compounds that create the dried anti-slip film. Some anti-slip agents are water soluble, synthetic polymers manufactured from petroleum based non-renewable raw materials that create pollution during manufacture, are not biodegradable and whose toxicity may have not have yet been determined. This combination of water solubility and potential toxicity allows the possibility spreading the anti-slip agent to areas where it may be more difficult to remove and where skin contact is possible, such as carpeting in the workplace, home, car, business establishments and restaurants.

Therefore, a need exists for an anti-slip floor coating that is effective in increasing the COF of floor surfaces to a minimum of 0.50, is neutral pH and not corrosive to skin, has no toxic volatile organic compounds and no toxic non-volatile compounds used as anti-slip agents, is manufactured from renewable resources and are biodegradable.

In addition to soil removal and anti-slip properties, it is important that an anti-slip detergent have antimicrobial disinfecting properties, to control the spread of infectious disease germs. While many anti-slip detergents contain surfactants with good antimicrobial properties when wet, these surfactants have little or no residual anti-microbial efficacy when dry. Therefore, some anti-slip detergents may contain residual germ killers such as Triclosan or other chemicals that contain organic halogen groups. These types of compounds are poisonous to germs, but may be cause the creation of "super bugs" similar to MRSA that have mutated to be resistant to compounds that kill germs via a poisoning mechanism.

The World Health Organization reported that of the 56 million reported deaths worldwide in 2012, 17% or 9.5 million deaths were attributed to infectious, communicable diseases. Deaths caused by infectious diseases in the United States in 2012 were placed at ~400,000 with ~100,000 being attributed to hospital acquired infections. Non-fatal bouts with infectious diseases are responsible for ~3.4 billion sick days each year in the United States alone. Therefore, it is important to apply an effective anti-microbial agent to floor surfaces during the cleaning process that is non-toxic to humans and pets, environmentally friendly, naturally derived from renewable resources and will not create "super bugs".

A wide range of natural organic compounds are used as antimicrobials. Organic acids are used widely as antimicrobials in food products, e.g. lactic acid, citric acid, acetic acid, and their salts, either as ingredients, or as disinfectants. For example, beef carcasses often are sprayed with acids, and then rinsed or steamed, to reduce the prevalence of E. coli.

Traditional healers long have used plants to prevent or cure infectious disease. Many of these plants have been investigated scientifically for antimicrobial activity, and a large number of plant products have been shown to inhibit the growth of pathogenic microorganisms. Therefore, it is worthwhile to study plants and plant products, such as essential oils for activity against bacteria, viruses, fungi and mold.

An essential oil is a concentrated hydrophobic liquid containing volatile aroma compounds obtained from the leaves, bark, stems, flowers and berries of plants that particular aroma represents. Essential oils are also known as volatile oils, ethereal oils, aetherolea, or simply as the "oil of" the plant from which they were extracted, such as oil of thyme. An oil is "essential" in the sense that it carries a distinctive scent, or essence, of the plant, and not that it is essential to life.

Essential oils are generally extracted by distillation, often by using steam. Other processes include expression or solvent extraction, including supercritical CO2. They are used in perfumes, cosmetics, soaps and other products, for flavoring food and drink, for aromatherapy and as natural, renewable antimicrobials.

Many essential oils included in pharmacopoeias possess antimicrobial activity, including but not limited to: oils of bay, cedar, cinnamon, citronella, clove, *eucalyptus*, garlic, geranium, lavender, leleshwa, lemon, lemongrass, mint neem, black cumin, onion, oregano, peppermint, rosemary, sandalwood, sesame, tea tree and thyme.

Essential oils that are listed as edible include: almond oil (bitter), anise oil, bergamot oil, camphor oil, caraway oil, *cassia* oil, cedar leaf oil, cedarwood oil, cinnamon oil, citronella oil, clove oil, cornmint oil (*Mentha arvensis*), *eucalyptus* oil, geranium oil, grapefruit oil, lavender oil (spike), lemon oil, lemongrass oil, lignaloe (bois derose oil), lime oil, neroli (orange lower oil), nutmeg oil, onion and garlic oil, mint oil, orange oil, oregano oil, *origanum* oil, orris oil, palmarosa oil, patchouli oil, peppermint oil (Menthapzperita) pettigrainolpine oil, pine needle oil, rose oil (attar of roses), rosemary oil, sandalwood oil, *sassafras* oil, sesame oil, spearmint oil, thyme oil, vetiver oil, and ylang ylang oil.

Therefore, some of the essential oils that are both edible and have antimicrobial properties include cedar, cinnamon, citronella, clove, *eucalyptus*, garlic, geranium, lavender, lemon, lemongrass, mint, oregano, peppermint, rosemary, sesame and thyme oils and D-limonene.

D-limonene differs from essential oils in that it is a pure chemical compound whereas essential oils are mixtures of a plurality of usually similar compounds that vary in their concentration. Virtually all of the citrus essential oils contain some degree of D-limonene making it an essential oil component. Since D-limonene is a by-product of the orange juice industry, it is plentiful and considerably lower in cost than essential oils. Many industries are now using D-limonene as a low toxicity alternative to many non-polar solvents such as toluene, hexanes and heptanes.

Essential oils that are recognized by the US Environmental Protection Agency as minimum risk active pesticides under section 25(b) of the Federal Insecticide, Fungicide & Rodenticide Act (FIFRA) are cedarwood, cinnamon, citronella, clove, garlic, geranium, lemongrass, mint, peppermint, sesame, and thyme oils.

The antimicrobial properties of 21 essential oils and two plant essences were investigated against five food-borne pathogens. The maximum bacteriostatic concentration was 0.075%, with the oils of bay, cinnamon, clove and thyme being the most potent (ref: A. Smith-Palmer, J. Stewart and L. Fyfe. "Antimicrobial Properties of Plant Essential Oils and Essences Against Five Important Food-Borne Pathogens", Letters in Applied Microbiology 1998. 26. 118-122).

Oil of thyme, the essential oil of the common herb thyme (*Thymus vulgaris*), contains 20-54% thymol. Thyme essential oil also contains a range of additional compounds, such as p-cymene, myrcene, borneol and linalool. Before the advent of modern antibiotics, oil of thyme was used to medicate bandages. Thymol, a powerful antiseptic, is the main active ingredient in various commercially produced mouthwashes. Thymol has also been shown to be effective against various fungi that commonly infect toenails. Thymol can also be found as the active ingredient in some all-natural, alcohol-free hand sanitizers and hard surface disinfectants such as Scotch-Brite Disinfectant Wipes where the active ingredient is 0.05% thymol as a component of thyme oil.

Microemulsion technology has been in existence for many years. In fact, many commercial microemulsion products are found in the marketplace, including beverages, personal care products, pesticide delivery systems, cutting oils and drug delivery systems.

Microemulsions are crystal clear because the micellar particle size is too small to scatter visible light. The IUPAC definition of microemulsion is "a dispersion of water, oil and surfactant(s) that is an isotropic and thermodynamically stable system with a dispersed domain diameter varying approximately from 1 to 100 nm, usually 10 to 50 nm." In contrast to ordinary, white macroemulsions that usually require high shear conditions to form, micro-emulsions form upon simple mixing of the components, without the need for high-energy homogenization. Also, microemulsions of the present inventions are stable against phase separation and remain crystal clear in both concentrated and ready to use form.

The methods of the present invention produces novel, crystal clear, stable, oil-in-water microemulsions using mainly food grade or excipient grade surfactants, edible botanical extracts or essential oils, and water. No alcohols are used or needed to maintain stability The microemulsion compositions and the preparation methods thereof provide high manufacturing efficiency and yield with no by-products, low toxicity, low production cost, simple preparation process, good safety in production, storage, transportation and use process, good environmental protection performance, are biodegradable and have excellent antimicrobial efficacy and anti-slip floor coating properties.

DESCRIPTION OF PRIOR ART

There exists a large amount of literature, including many patents and patent applications, dealing with the subject of microemulsions of essential oils. This literature can be grouped into two main end uses; edible micro-emulsions used to introduce essential oils into food and beverages and non-edible micro-emulsions used as antimicrobial disinfectants and cleaners. There was no literature found that used the dried films of microemulsions as anti-slip floor coatings.

For example, U.S. Pat. No. 4,835,002 granted to Wolf et al. teaches the manufacture of edible microemulsions of essential oils using a food grade surfactant and a polar alcohol such as ethanol, propylene glycol, glycerol, sugar or sugar alcohol in very high concentrations. The microemulsion is crystal clear and stable but there are no claims made for its use as an antimicrobial, but only as a beverage additive.

U.S. Pat. No. 5,376,397 assigned to Kraft Foods teaches the manufacture of edible microemulsion of flavor oils such as coffee oil that will not microemulsify using the surfactants and alcohols set forth in the above Wolf patent by using water immiscible alcohol (dodecanol). However, no antimicrobial claims are made.

U.S. Pat. No. 5,891,490 assigned to Nestles teaches the manufacture of edible microemulsion for coating food products that will brown in a microwave oven. However, no antimicrobial claims are made.

U.S. Pat. No. 6,902,756 assigned to Firmenick teaches the manufacture of transparent, high citrus oil loaded microemulsions for clear beverages that have excellent thermodynamic stability with over 30% oil loading and remain stable when diluted more than 100× in the final beverage. However, no antimicrobial claims are made.

WO2013075921 patent application assigned to Unilever N.V. teaches the manufacture of antimicrobial microemulsions of the essential oil components eugenol, turpinenol and thymol and a cationic surfactant selected from benzalkonium chloride or cetyltrimethyl ammonium bromide. Although an effective antimicrobial combination, only thymol is edible as a component of thyme oil.

EP2460409 patent application assigned to Nestec teaches the manufacture of a food grade emulsion of various antimicrobial essential oils using all food grade components including the oils and the gum acacia surfactant system. No claim is made the emulsions are clear microemulsion.

U.S. Pat. No. 8,417,877 assigned to Ohso Clean Inc teaches the manufacture of a stable microemulsion of thyme oil emulsified with alkylpolyglucocide or sodium lauryl sulfate but also contains cupric sulfate which has moderate human toxicity.

U.S. Pat. No. 6,346,281 assigned to Scensible Life teaches the manufacture of an emulsion of thyme, lemongrass and *eucalyptus* oils using a small amount of ethanol and a biosurfactant but also contains one of cupric sulfate, cupric carbonate or colloidal silver, all considered moderately toxic.

In light of the above referenced patents and applications and all other not referenced literature, there is a clear and present need for an all food grade antimicrobial essential oil microemulsion that demonstrates excellent antimicrobial efficacy over a wide range of microbes, is stable for greater than one year without gaining turbidity or separating (ringing), has little or no toxicity to humans and animals and can be used around food preparation areas without concern for food contamination and uniquely and unexpectedly to also provide anti-slip properties on all hard surfaces that are walked upon. It is an objective of this instant invention to provide such a method for the use of same.

BRIEF SUMMARY OF THE INVENTION

This instant invention is a method for coating a hard flooring surface to impart both anti-slip and anti-microbial properties to the coated floor comprising the manufacture of botanical antimicrobial microemulsions where the antimicrobial oils are chosen from the collective group of volatile essential oils that are commonly obtained by steam distillation or cold pressing of stems, bark, leaves, fruit, peels and flowers of various plant species throughout the world. Some of the preferred essential oils used in this instant invention are derived from leaves that are edible herbs. Other preferred essential oils are extracted from the peels of citrus fruits that are used as flavorings for food and beverages. This source of antimicrobial oils is plentiful, renewable and generally regarded as safe, having low toxicity to humans and animals. This invention teaches methods of manufacture of crystal clear, stable, edible microemulsions with essential oils that show no sign of clouding due to phase separation when aged at room temperature for >12 months at essential oil concentrations that allow for good transportation economics and, when further diluted with water to ready to use (RTU) strength, have excellent utility as both hard surface disinfectants and anti-slip agents on hard surface flooring.

The objective of this invention is to provide an inexpensive method to protect hard flooring to easily manufacture compositions containing multi-functional, non-toxic, non-corrosive, organic solvent-free, environmentally friendly, stable microemulsion concentrates whose active ingredients are derived from renewable, edible botanical essential oils, are economical to ship, then diluted up to 150× with tap water to ready to use (RTU) form.

DETAILED DESCRIPTION OF THE INVENTION

For purposes of demonstrating the method of this invention, the following volatile essential oils were selected as preferred examples that are both antimicrobial and edible: cinnamon, citronella, *eucalyptus*, geranium, lavender, lemongrass, peppermint, thyme and D-limonene.

These essential oils are mainly produced in foreign countries and imported into the United States in drum or pail quantities, then repackaged and sold in quantities from a few grams to a few ounces at very high margins. There is no shortage of US sources who are providing this service on sites like Ebay, Amazon and on-line stores. The essential oils for this invention were purchased from Wfmed, Lorton Va. 22079 and The Herbarie at Stoney Hill Farm, Inc. Prosperity, SC 29127. Both of these distributors of volatile essential oils have excellent websites with lots of helpful literature including MSDS and specification sheets with ranges of the components that make up the standard of identities of the oils.

The surfactant system used to make crystal clear microemulsions of essential oils in water consists of 2 surfactants, an oil/water soluble and a water soluble surfactant. The oil/water soluble surfactant is a C9 to C11 alcohol 6 mole ethoxylate (CAS#68439-46-3), manufactured by many companies. Neodol 91-6, used to generate the examples in this instant invention, is the registered trademark of Shell Chemical. Neodol 91-6 is a synthetic, nonionic surfactant with a hydrophile-lipophile balance (HLB) of 12. Its utility comes from its solubility in both essential oils and in water, and the ability to stabilize emulsions of nonpolar materials in aqueous systems.

The water soluble surfactant used to produce crystal clear microemulsions is Polysorbate 20 (polyoxyethylene (20) sorbitan monolaurate) and is available from ICI Americas as Tween 20 (CAS#9005-64-5). The stability and relative non-toxicity of Tween 20 allows its use in a number of domestic and pharmacological applications including as a wetting agent in flavored cough drops and as an excipient in many prescription drugs. The World Health Organization has suggested acceptable daily intake limits of 0-25 mg of polyoxyethylene sorbitan fatty esters per kg of body weight. The HLB of Tween 20 is 16.7 and its critical micelle concentration is 0.01%.

To improve the cleaning and anti-slip properties of the microemulsion, additional surfactants and other compounds may optionally be added such as alkyl glucosides and polyglucosides and their derivatives, colloidal silica, glycerine, palm kernel oil, tall oil and its derivatives, and various vegetable, mineral or petroleum waxes.

In addition to the above ingredients, acetic acid buffer system is used to control system pH, provide an antioxidant to retard oxidation of system components and to contribute to antimicrobial efficacy. Below is a typical formula range for making a crystal clear, concentrated microemulsion from edible, antimicrobial essential oils in water using the above surfactant system.

| Essential Oils (Total) | 1-15 Wt % |
|---|---|
| Neodol 91-6 | 1-15 |
| Water | 24-97 |
| Tween 20 | 1-25 |
| Ethylenediaminetetra acetic acid Na4 salt | 0.1-0.3 |
| Glacial Acetic Acid | 0.01-0.10 |
| Addditional Anti-Slip Additives | 0-20 |

Normally when preparing these microemulsions, order of addition is very important. The essential oils are first added to a dry mixing vessel followed by adding the Neodol 91-6 which mixes in the essential to form a low viscosity, easily mixable, clear solution that was then heated to 65-75 C. In a separate vessel the hot city water is added followed by Tween 20 and mixed to form a low viscosity, clear solution. EDTA Na4 salt is added and acetic acid to pH 5 to 7. The resultant buffered aqueous solution is heated to 65-75 C.

While the hot essential oils/Neodol 91-6 solution is adequately mixing, the aqueous buffer/Tween 20 is added to it. After all of the aqueous addition is complete, the system is agitated and cooled to 30-35 C. The product will be a crystal clear concentrated microemulsion of essential oils in water that is stable at room temperature indefinitely. The clarity will be <10 Nephelos Turbidity Units (NTU) using a Hach Ratio Turbidimeter.

The rate of addition is also dependent upon the essential oils being used. Some essential oils allow addition times as rapid as less than one minute, while other systems require a longer essential oil addition times. If any turbidity of the cooled product occurs, there is a good chance a microemulsion will not be formed to completion resulting in less than crystal clarity of the final dispersion. Cloudy microemulsions may be repaired to form clear micro-emulsions by post heating the fully diluted microemulsion to 65-75 C, then stopping the agitation and allowing the microemulsion to slowly cool to room temperature.

While the above "best mode" of operation represents the process for manufacturing a stable, antimicrobial, non-toxic, crystal clear microemulsion concentrate that can be economically transported, this concentrate can be diluted with water using a ratio of 30 to 150 parts (by wt.) of tap water to one part of concentrate using any order of addition, any temperature and any type of mixing to make the final "ready to use" (RTU) consumer product. For example, 8 g of concentrate can be added to 792 g of water in a 1 quart spray bottle, the bottle slowly shaken for ~10 seconds, and the result will be a fully uniform RTU microemulsion. The RTU product will also be a crystal clear, stable, water thin (easily sprayed) anti-slip, antimicrobial microemulsion that will not cloud upon aging. Current aging studies have been running over 1 year and these RTU products have remained crystal clear (<10 NTU) regardless of the essential oils used. This ease of dilution of the microemulsion concentrate and the subsequent stability of the highly diluted RTU product were unexpected and further demonstrates the unique nature of this process.

Essential oils can be used individually in the process of this invention or they can be used in combinations to generate unique and desirable fragrances. For example, many botanical antimicrobial emulsions are produced and marketed based on the powerful germicidal thymol which is a major component of thyme oil. As of 2014 there were 16 active EPA registrations under FIFRA for the use of thymol as the active ingredient in a germicidal emulsion at concentrations as low as 0.05% by weight of the emulsion. Most of these products use natural thymol as a component of thyme oil. However, thyme oil smells somewhat medicinal to many people who may prefer a citrus, mint or floral fragrance rather than a medicinal one. It is a further embodiment of this invention to use mixtures of various essential oils that provide both high antimicrobial broad spectrum efficacy while delivering a very pleasant aroma, similar to using essential oils for aromatherapy.

Several combinations of essential oils that have been converted to microemulsions using the method of this invention which improved the aroma of thyme oil are: Lavender/Lemongrass/Thyme, Cinnamon/Thyme and D-Limonene/Thyme. The use of D-limonene has the added economic advantage of much lower cost compared to other essential oils, probably due to the glut of orange peels created by the orange juice industry and the ease of recovering and purifying D-limonene from the peels.

The dilution rate of the resultant concentrated microemulsion to RTU strength in the case of using combinations of essential oils that include thyme oil was calculated by determining the amount of water needed to dilute the thymol content to 0.05% by weight of the RTU product. This is based on analysis of label claims of EPA registered products listing thymol as the only active ingredient at 0.05%. For example, Scotch-Brite botanical disinfecting wipes claims "Kills over 99.9% of household germs: *Pseudomonas aeruginosa, Salmonella enterica, Staphylococcus aureus*, Methicillin Resistant *S. aureua* (MRSA), Enterobact *aerogenes*, Influenza A virus, Rhinovirus type 37, and Human Immunodeficiency Virus (HIV) type 1. Sanitizes hard non-porous, non-food contact surfaces of *Staphylococcus aureus* and *Enterobact aerogenes* in the presence of light to moderate soil load with a 30 second contact time".

Oil of Thyme can range from 20% to 54% thymol. The thymol assay of the individual lot of thyme oil is needed along with the amount of thyme oil (weight %) used in the microemulsion in order to calculate the amount of dilution water that needs to be added to the concentrate to generate the RTU product.

Therefore it is important to maximize the amount of thyme oil in the concentrated microemulsion while still incorporating enough of a more aromatic essential oil to give the end user a pleasant aroma during application. It is a further benefit that the choice of the more aromatic oils also augments the broad spectrum antimicrobial efficacy of the RTU product.

After extensive testing of dried films of microemulsions and other anti-slip additives as prepared above, it has been determined these films are exceptionally effective as anti-slip coatings by increasing the coefficient of friction (COF) of hard flooring to greater than 0.50, which is the minimum value needed to prevent most slips and falls. An extensive series of commercial trials was run on vinyl floor tile over several months at a major retailer and the results showed these microemulsion dried coatings consistently increased the COF from the 0.35-045 range to the 0.60-0.70 range without diminishing the gloss of the vinyl tile.

Listed below are several, non-limiting examples of concentrated microemulsions prepared according to the detailed description of this invention that have a pleasant aroma in use, yet most are high in thyme oil content as well as examples that are extremely economical to produce. These examples are provided to further augment the teachings of this invention and are not, in any way, to be misconstrued as limiting the scope of it.

EXAMPLES

Example #1

Control for Improved Odor Examples 2 thru 6. Into a 250 ml Erlenmeyer was added 11.8 g of thyme essential oil (white *Thymus Zigus* at 50% thymol concentration) followed by 12.0 g of Neodol 91-6. Moderate stirring produced a clear, thin solution at room temperature. Into a 200 ml beaker was added 52.5 g of distilled water followed by 21.5 g of Tween 20. Slightly longer mixing produced a clear, thin aqueous solution. To this aqueous solution was added 0.25 g of 40% aqueous EDTA Na4. A pH probe was inserted into the beaker and the pH of the aqueous mixture was neutralized from pH ~11 to pH 5.0 to 7.0 using acetic acid. The resultant buffered solution was clear and thin. Both the oil and aqueous solutions were heated simultaneously to 65-75 C in a microwave oven as measured by an infrared laser thermometer. The solutions were removed from the oven and the oil solution was magnetically stirred at moderate speed. The hot aqueous solution was slowly poured into the agitation oil solution over 30 to 60 seconds. When the addition was finished the resultant microemulsion was crystal clear and low in viscosity and was allowed to cool to 30-35 C with agitation using ambient air cooling. The cooled microemulsion was clear and was analyzed at 5 NTU using a Hach Ratio Turbidimeter. The bottled pack out yield was 99 g of concentrate. The concentrate remained at 5 NTU clarity when aged at 25 C for >12 months.

One g of concentrate was diluted with 117 g of distilled water to produce a clear, water thin RTU antimicrobial hard surface cleaner that had the following analysis: 0.05% thymol, pH 6.0, VOC content 0.1%, 0.34% total surfactant content, clarity of 3 NTU, clarity after 1 year aging at 25 C of 3 NTU with no phase separation; odor during use was medicinal.

Example #2

Into a 250 ml Erlenmeyer was added 9.65 g of thyme essential oil (white *Thymus Zigus* at 50% thymol concentration) and 2.15 g of cinnamon essential oil followed by 12.0 g of Neodol 91-6. Moderate stirring produced a clear, thin solution at room temperature. Into a 200 ml beaker was added 52.5 g of distilled water followed by 21.5 g of Tween 20. Slightly longer mixing produced a clear, thin aqueous solution. To this aqueous solution was added 0.25 g of 40% aqueous EDTA Na4. A pH probe was inserted into the beaker and the pH of the aqueous mixture was neutralized from pH ~11 to pH 5.0 to 6.0 using acetic acid. The resultant buffered solution was clear and thin. Both the oil and aqueous solutions were heated simultaneously to 65-75 C in a microwave oven as measured by an infrared laser thermometer. The solutions were removed from the oven and the oil solution was magnetically stirred at moderate speed. The hot aqueous solution was slowly poured into the agitation oil solution over 30 to 60 seconds. When the addition was finished the resultant microemulsion was crystal clear and low in viscosity and was allowed to cool to 30-35 C with agitation using ambient air cooling. The cooled microemulsion was clear and was analyzed at 6 NTU using a Hach Ratio Turbidimeter. The bottled pack out yield was 99 g of concentrate. The concentrate remained at 6 NTU clarity when aged at 25 C for >12 months with no phase separation. One g of concentrate was diluted with 95.5 g of distilled water to produce a clear, water thin RTU antimicrobial hard surface cleaner that had the following analysis: 0.05% thymol, pH 5.7, VOC content 0.12%, 0.34% total surfactant content, clarity of 4 NTU, clarity after 1 year aging at 25 C of 4 NTU with no phase separation; odor during use was that of cinnamon.

Example #3

Into a 250 ml Erlenmeyer was added 9.1 g of thyme essential oil (white *Thymus Zigus* at 50% thymol concentration), 2.0 g of D-limonene and 0.7 g of orange oil followed by 12.0 g of Neodol 91-6. Moderate stirring produced a clear, thin solution at room temperature. Into a 200 ml beaker was added 52.5 g of distilled water followed by 21.5 g of Tween 20. Slightly longer mixing produced a clear, thin aqueous solution. To this aqueous solution was added 0.25 g of 40% aqueous EDTA Na4. A pH probe was inserted into the beaker and the pH of the aqueous mixture was neutralized from pH ~11 to pH 5.0 to 6.0 using acetic acid. The resultant buffered solution was clear and thin.

Both the oil and aqueous solutions were heated simultaneously to 65-75 C in a microwave oven as measured by an infrared laser thermometer. The solutions were removed from the oven and the oil solution was magnetically stirred at moderate speed. The hot aqueous solution was slowly poured into the agitation oil solution over 30 to 60 seconds. When the addition was finished the resultant microemulsion was crystal clear and low in viscosity and was allowed to cool to 30-35 C with agitation using ambient air cooling. The cooled microemulsion was clear and was analyzed at 7 NTU using a Hach Ratio Turbidimeter. The bottled pack out yield was 99 g of concentrate. The concentrate remained at 7 NTU clarity when aged at 25 C for >12 months without any phase separation.

One g of concentrate was diluted with 90 g of distilled water to produce a clear, water thin RTU antimicrobial hard surface cleaner that had the following analysis: 0.05% thymol, pH 6.0, VOC content 0.13%, 0.34% total surfactant content, clarity of 5 NTU, clarity after 1 year aging at 25 C of 5 NTU with no phase separation; odor during use was citrus orange.

Example #4

Into a 250 ml Erlenmeyer was added 3.3 g of thyme essential oil (white *Thymus Zigus* at 50% thymol concentration) 2.2 g of lemongrass essential oil, and 6.3 g of Lavender oil followed by 12.0 g of Neodol 91-6. Moderate stirring produced a clear, thin solution at room temperature. Into a 200 ml beaker was added 52.5 g of distilled water followed by 21.5 g of Tween 20. Slightly longer mixing produced a clear, thin aqueous solution. To this aqueous solution was added 0.25 g of 40% aqueous EDTA Na4. A pH probe was inserted into the beaker and the pH of the aqueous mixture was neutralized from pH ~11 to pH 5.0 to 6.0 using acetic acid. The resultant buffered solution was clear and thin.

Both the oil and aqueous solutions were heated simultaneously to 65-75 C in a microwave oven as measured by an infrared laser thermometer. The solutions were removed from the oven and the oil solution was magnetically stirred at moderate speed. The hot aqueous solution was slowly poured into the agitation oil solution over 30 to 60 seconds. When the addition was finished the resultant microemulsion was crystal clear and low in viscosity and was allowed to cool to 30-35 C with agitation using ambient air cooling. The cooled microemulsion was clear and was analyzed at 8 NTU using a Hach Ratio Turbidimeter. The bottled pack out yield was 99 g of concentrate. The concentrate remained at 8 NTU clarity when aged at 25 C for >12 months without any phase separation.

One g of concentrate was diluted with 32 g of distilled water to produce a clear, water thin RTU antimicrobial hard surface cleaner that had the following analysis: 0.05% thymol, pH 5.8, VOC content 0.36%, 0.34% total surfactant content, clarity of 7 NTU, clarity after 1 year aging at 25 C of 7 NTU with no phase separation; odor during use was lemon floral.

Example #5

Into a 250 ml Erlenmeyer was added 10.0 g of thyme essential oil (white *Thymus Zigus* at 50% thymol concentration) and 1.8 g of geranium oil followed by 12.0 g of Neodol-91-6. Moderate stirring produced a clear, thin solution at room temperature. Into a 200 ml beaker was added 52.5 g of distilled water followed by 21.5 g of Tween 20. Slightly longer mixing produced a clear, thin aqueous solution. To this aqueous solution was added 0.25 g of 40% aqueous EDTA Na4. A pH probe was inserted into the beaker and the pH of the aqueous mixture was neutralized from pH ~11 to pH 5.0 to 6.0 using acetic acid. The resultant buffered solution was clear and thin.

Both the oil and aqueous solutions were heated simultaneously to 65-75 C in a microwave oven as measured by an infrared laser thermometer. The solutions were removed from the oven and the oil solution was magnetically stirred at moderate speed. The hot aqueous solution was slowly poured into the agitation oil solution over 30 to 60 seconds. When the addition was finished the resultant microemulsion was crystal clear and low in viscosity and was allowed to cool to 30-35 C with agitation using ambient air cooling. The cooled microemulsion was clear and was analyzed at 6 NTU using a Hach Ratio Turbidimeter. The bottled pack out yield was 99 g of concentrate. The concentrate remained at 6 NTU clarity when aged at 25 C for >12 months without any phase separation. One g of concentrate was diluted with 99 g of distilled water to produce a clear, water thin RTU antimicrobial hard surface cleaner that had the following analysis: 0.05% thymol, pH 6.0, VOC content 0.12%, 0.34% total surfactant content, clarity of 4 NTU, clarity after 1 year aging at 25 C of 4 NTU with no phase separation; odor during use was of roses.

Example #6

(Designed for superior anti-slip properties) Into a 250 ml Erlenmeyer was added 4.08 g of D-limonene followed by 2.08 g of Neodol 91-6. Moderate stirring produced a clear, thin solution at room temperature. Into a 200 ml beaker was added 15.0 g of tap water (180 u MHOs) followed by 0.17 g of 40% aqueous EDTA Na4. A pH probe was inserted into the beaker and the pH of the aqueous mixture was neutralized from pH~11 to pH 5.0 to 6.0 using 0.03 g of glacial acetic acid. To the resultant buffered solution was added 4.5 g of Tween 20 and 13.62 g of anti-slip additives. Mixing produced a clear, thin aqueous solution. Both the oil and aqueous solutions were heated simultaneously to 25-75 C in a microwave oven as measured by an infrared laser thermometer. The solutions were removed from the oven and the oil solution was magnetically stirred at moderate speed. The heated aqueous solution was slowly poured into the agitation oil solution over 30 to 60 seconds. When the addition was finished the resultant microemulsion was crystal clear and low in viscosity, and was allowed to cool to 25 C with agitation using ambient air cooling. With mixing, 65.52 g of tap water (180 u MHOS) was added. The cooled microemulsion was clear and was analyzed at 6 NTU using a Hach Ratio Turbidimeter. The bottled pack out yield was 99 g of concentrate. The concentrate remained at 6 NTU clarity when aged at 25 C for >12 months without any phase separation. One g of concentrate was diluted with 49 g of tap water to produce a clear, water thin RTU anti-slip antimicrobial hard surface cleaner that had the following analysis: 0.082% D-limonene, pH 6.0, VOC content 0.08%, 0.27% total surfactant content, clarity of 4 NTU, clarity after 1 year aging at 25 C of 4 NTU with no phase separation; odor during use was light citrus orange. Anti-slip testing of the dried film using various methods on a variety of hard surfaces yielded a minimum of 0.60 coefficient of friction using a treatment rate of 0.40 g/ft2.

TABLE I

Summary of Examples with Formula and Analysis

| Ingredient | Ex. 1 Wt % | Ex. 2 Wt % | Ex. 3 Wt % | Ex. 4 Wt % | Ex. 5 Wt % | Ex. 6 Wt % |
|---|---|---|---|---|---|---|
| Thyme Essential Oil | 11.80 | 9.65 | 9.10 | 3.30 | 10.00 | |
| Cinnamon Essential Oil | | 2.15 | | | | |
| D-Limonene | | | 2.00 | | | 4.08 |
| Rose *Geranium* EssentialOil | | | | | 1.80 | |
| Lemongrass Essential Oil | | | | 2.20 | | |
| Lavender Essential Oil | | | | 6.30 | | |
| Orange Essential Oil | | | 0.70 | | | |
| Neodol 91-6 | 12.00 | 12.00 | 12.00 | 12.00 | 12.00 | 2.08 |
| Water | 54.40 | 54.40 | 54.40 | 54.40 | 54.40 | 75.52 |
| Tween 20 | 21.50 | 21.50 | 21.50 | 21.50 | 21.50 | 4.5 |

TABLE I-continued

Summary of Examples with Formula and Analysis

|  | Ex. 1 Wt % | Ex. 2 Wt % | Ex. 3 Wt % | Ex. 4 Wt % | Ex. 5 Wt % | Ex. 6 Wt % |
|---|---|---|---|---|---|---|
| EDTA Na4 (40% in water) | 0.25 | 0.25 | 0.25 | 0.25 | 0.25 | 0.17 |
| Acetic Acid (Glacial) | 0.05 | 0.05 | 0.05 | 0.05 | 0.05 | 0.03 |
| Anti-Slip Additives |  |  |  |  |  | 13.62 |
| Total | 100.00 | 100.00 | 100.00 | 100.00 | 100.00 | 100.00 |
| Concentrate Analysis |  |  |  |  |  |  |
| Clarity (NTU) | 5 | 6 | 7 | 8 | 6 | 6 |
| Aging Stability at 25 C. (months) | >12 | >12 | >12 | >12 | >12 | >12 |
| RTU Analysis |  |  |  |  |  |  |
| Dilution Rate (per 1 pbw Conc) | 117 | 95.5 | 90 | 32 | 99 | 49 |
| Thymol wt. % | 0.050 | 0.051 | 0.051 | 0.052 | 0.051 | 0 |
| pH | 6.0 | 5.7 | 6.0 | 5.8 | 6.0 | 5.5 |
| VOC wt. % | 0.10 | 0.12 | 0.13 | 0.37 | 0.12 | 0.14 |
| Clarity (NTU No Change > 12 Mo) | 3.0 | 4.0 | 5.0 | 7.0 | 4.0 | 4.0 |
| Odor | Medicinal | Cinnamon | Orange | Citrus/Floral | Rose | Orange |

While the invention has been described with respect to specific examples, variations and modifications may be made without departing from the spirit and scope of the invention. Such variations and modifications are to be considered within the purview and scope of the invention as defined by the appended claims:

What I claim is:

1. A method for coating a flooring surface for imparting both anti-slip and antimicrobial properties to the coated flooring surface, the method consisting of:

forming a thermodynamically stable oil-in-water anti-slip botanical antimicrobial, microemulsion concentrate by using one or more antimicrobial essentials oils that are naturally derived and edible, the one or more antimicrobial essential oils selected from a group consisting of cedarwood, cinnamon, citronella, clove, eucalyptus, garlic, geranium, lavender, lemon, lemongrass, mint, orange, oregano, peppermint, rosemary, sesame, thyme oils and D-limonene, using one or more surfactants defined as C9 to C11 aliphatic alcohol ethoxylate at 6 mole as an oil phase surfactant and polyoxyethylated sorbitan mono fatty ester as a water phase surfactant, the oil phase and water phase surfactants being derivatives of naturally occurring botanicals, using a buffer/sequesterant system at a pH that is not corrosive and using a continuous phase solvent defined as tap water without any organic solvents present, diluting the microemulsion concentrate up to 150× with water to ready to use (RTU) strength, and applying the diluted RTU microemulsion to the floor surface uniformly and allowing it to dry, resulting in the flooring surface that defines a coefficient of friction (COF) of greater than 0.50, wherein the thermodynamically stable oil-in-water anti-slip botanical antimicrobial, microemulsion concentrate is crystal clear <10 Nephelos Turbidity Units (NTU) using a Hach Ratio Turbidimeter and stable with no oil/water separation for >12 months at 25° C. without need for high shear mixing equipment.

2. The method of claim 1 whereby the diluting of the microemulsion concentration up to 150× further comprises diluting using a ratio of 30 to 150 parts by wt. of tap water to one part of microemulsion concentrate.

* * * * *